United States Patent [19]
Yates et al.

[11] Patent Number: 5,933,966
[45] Date of Patent: Aug. 10, 1999

[54] SHAFT TELESCOPING AND ROTATIONAL ADJUSTMENT MECHANISM FOR A LAWN AND GARDEN TOOL

[75] Inventors: Jan B. Yates, Reynoldsburg; Gregory A. Trees, Columbus, both of Ohio

[73] Assignee: McCulloch Corporation, Tucson, Ariz.

[21] Appl. No.: 08/898,990

[22] Filed: Jul. 23, 1997

[51] Int. Cl.⁶ .......................... A01D 50/00; A01D 55/00
[52] U.S. Cl. .............................. 30/276; 403/325
[58] Field of Search .................... 30/276, 296.1; 56/12.7; 16/111 A, 115; 403/321, 325

[56] References Cited

U.S. PATENT DOCUMENTS

| | | | |
|---|---|---|---|
| Re. 34,358 | 8/1993 | Miller | 30/296.1 |
| 2,091,495 | 8/1937 | Steen | 16/115 |
| 3,317,997 | 5/1967 | Hedstrom et al. | 30/248 |
| 4,052,789 | 10/1977 | Ballas, Sr. | 30/276 |
| 4,156,312 | 5/1979 | Ballas, Sr. | 30/276 |
| 4,156,967 | 6/1979 | Ballas, Sr. | 30/276 |
| 4,360,971 | 11/1982 | Fellmann | 30/296.1 |
| 4,409,866 | 10/1983 | McBride | 81/177 A |
| 4,603,478 | 8/1986 | Anderson | 30/276 |
| 4,733,471 | 3/1988 | Rahe | 30/275 |
| 4,825,548 | 5/1989 | Driggers | 30/276 |
| 4,829,675 | 5/1989 | Beihoffer | 30/276 |
| 4,894,914 | 1/1990 | Mead | 30/276 |
| 4,899,446 | 2/1990 | Akiba et al. | 30/276 |
| 4,936,886 | 6/1990 | Chapman | 43/42 |
| 5,027,674 | 7/1991 | Nolte et al. | 74/493 |
| 5,446,964 | 9/1995 | Woods et al. | 30/276 |
| 5,560,108 | 10/1996 | Wilson | 30/276 |
| 5,594,990 | 1/1997 | Brant et al. | 30/122 |
| 5,628,088 | 5/1997 | Chen | 16/115 |
| 5,662,428 | 9/1997 | Wilson | 30/276 |

FOREIGN PATENT DOCUMENTS

| | | |
|---|---|---|
| 0 170 744 A1 | 2/1986 | European Pat. Off. . |
| 0 515 909 A1 | 12/1991 | European Pat. Off. . |
| 0 653 364 A2 | 5/1995 | European Pat. Off. . |
| 0 703 044 A1 | 3/1996 | European Pat. Off. . |

*Primary Examiner*—Hwei-Siu Payer
*Attorney, Agent, or Firm*—Marshall, O'Toole, Gerstein, Murray & Borun

[57] ABSTRACT

A lawn and garden tool, such as a string trimmer, includes a lower housing, an upper housing having one or more axial channels interconnected with one or more circumferential channels disposed on an interior surface thereof and a shaft connected between the upper housing and the lower housing. A boss is located on an exterior surface of the shaft and is disposed within the channels such that the boss is capable of traveling back and forth between the interconnected axial and circumferential channels. Movement of the boss within one of the axial channels telescopes the shaft while movement of the boss within one of the circumferential channels rotates the shaft and, thereby, rotates the lower housing with respect to the upper housing. The shaft may be moved from a locked position upon actuation of a push-button mechanism located on the upper housing of the string trimmer.

17 Claims, 4 Drawing Sheets

SHAFT TELESCOPING AND ROTATIONAL ADJUSTMENT MECHANISM FOR A LAWN AND GARDEN TOOL

TECHNICAL FIELD

The present invention relates generally to lawn and garden tools and, more particularly, to a lawn and garden tool having a simple and convenient adjustment mechanism that allows telescoping and rotation of a shaft associated with the tool.

BACKGROUND ART

Hand-held lawn and garden tools, such as string or blade trimmers, are well known in the art and are used in many applications to cut vegetation in places that are typically inaccessible to conventional lawn mowers. Standard string trimmers include a cutting mechanism having a rotating head from which a flexible string or cutting line protrudes, a handle having a trigger that enables an operator to actuate the cutting mechanism and a shaft connected between the cutting mechanism and the handle that allows the operator to move or swing the cutting mechanism from a standing position.

Some known lawn and garden tools, such as string trimmers, include a shaft that may be extended or retracted to change the length of the device to thereby accommodate users of different heights. Also, some known string trimmers include a shaft that may be rotated by 180 degrees or more with respect to a handle of the trimmer to allow the cutting mechanism to be oriented in either a horizontal plane or in a vertical plane, which is common in edging applications. Some string trimmers have a shaft capable of both rotation and elongation, but typically include a complex shaft adjustment mechanism that is difficult to operate and/or that is located at an inconvenient place on the device.

For example, Brant et al. (U.S. Pat. No. 5,594,990) discloses a string trimmer having a shaft that may be initially elongated to a predetermined length and that may be rotated by 180 degrees at any time during operation. The Brant et al. trimmer includes a shaft having spring-loaded pins that protrude from the sides thereof and that are moveable in a radial direction with respect to the shaft. When the string trimmer is first removed from the box, the pins are disposed in axial channels formed within a casing of the cutting mechanism of the trimmer. The axial channels terminate at a pair of circumferential channels. During initial set-up, the shaft is elongated by pulling on the shaft, which forces the pins to slide within the axial channels toward the circumferential channels. Ramps disposed at the ends of the axial channels force the pins radially inwardly as they approach the circumferential channels and, when the ends of the axial channels are reached, the pins snap radially outwardly into the circumferential channels where one of the pins is locked into place. At this time, the pins are prevented from returning to the axial channels by the walls of the circumferential channels, thereby preventing further axial movement of the shaft.

During operation, a button on the casing of the cutting mechanism of the Brant et al. trimmer may be actuated to force the locked pin radially inwardly, out of the locking position. This movement enables the pins to travel 180 degrees within the circumferential channels, thereby allowing the shaft to rotate with respect to the casing until the other pin reaches a locking position. In this manner, the string trimmer can be reconfigured from a horizontal cutting device to a vertical cutting device or vice-versa. Unfortunately, the shaft of the Brant et al. device cannot be elongated or shortened after initial set-up and cannot be locked at an axial position other than the predetermined position associated with the circumferential channels. Also, the button of the Brant et al. device (which enables rotation of the shaft) is located on the casing of the cutting mechanism, which is inconvenient because it forces the user to bend over to effect rotation of the shaft or the cutting mechanism.

European Patent Application Number 0 653 364 A2 discloses a string trimmer having a shaft that may be elongated and/or rotated. The string trimmer of this document includes a square shaft with a series of serrations disposed on each of the four sides thereof, a locking mechanism having four teeth adapted to be disposed within one of the serrations on each of the four sides of the shaft and a locking ring that rotates between a first position, at which the teeth are locked within the serrations, and a second position at which the teeth are removable from the serrations. In order to elongate or rotate the shaft, the locking ring is rotated to the second position so that the teeth are allowed to come out of the serrations of the shaft. Thereafter, the shaft may be rotated and/or elongated until the teeth reside in different ones of the serrations. When the desired rotation or length of the shaft has been attained, the locking mechanism is rotated back to the first position, which locks the teeth within the serrations to prevent movement of the shaft with respect to an upper housing of the string trimmer.

While the string trimmer disclosed in this document allows telescoping and rotation of a shaft, the locking mechanism is difficult to actuate because it requires a user to grasp and then to rotate a member around the shaft of the string trimmer. Likewise, the locking mechanism is not positioned at an easily accessible place on the handle of the string trimmer but is, instead, located between the upper housing and the cutting mechanism, which again forces the user to bend over to actuate the locking mechanism.

SUMMARY OF THE INVENTION

According to the present invention, a lawn and garden tool, such as a string trimmer, includes a simple push-button actuation mechanism that enables both telescoping and rotation of a shaft of the tool which, in turn, allows the shaft to be lengthened or shortened to any of several preset lengths and allows the tool to be converted between, for example, a horizontal orientation and a vertical orientation. Furthermore, the push-button mechanism of the present invention is located at a convenient spot on the handle of the lawn and garden tool and may be actuated by an operator without requiring the operator to bend over or to reach down onto a lower casing of the tool. Still further, the push-button mechanism of the present invention may be actuated without requiring the operator to perform any complex motions, such as rotating a locking ring around the shaft of the tool.

According to one aspect of the present invention, a lawn and garden tool includes a lower housing, an upper housing having one or more axial channels interconnected with one or more circumferential channels and a shaft connected between the upper housing and the lower housing. The shaft includes a boss adapted to travel in the interconnected axial and circumferential channels such that movement of the boss within one of the axial channels telescopes the shaft while movement of the boss within the one of the circumferential channels rotates the shaft and, thereby, rotates the lower housing with respect to the upper housing.

Preferably, a locking mechanism is disposed on the upper housing to lock the shaft at one of a number of predetermined positions. The locking mechanism may include a detent mechanism adjacent a locking member that is moveable between first and second positions. The locking member comes into contact with and prevents movement of the detent mechanism when the locking member is in the first position and the locking member allows movement of the detent mechanism when the locking member is in the second position. A spring may bias the locking member toward the first position.

Also, the shaft of the lawn and garden tool may include a first and a second series of axially spaced indentations or holes angularly offset from each other by 180 degrees. Each of the indentations is adapted to accept a detent of the detent mechanism to effect locking of the shaft at one of a plurality of predetermined axial and rotational positions of the shaft.

According to another aspect of the present invention, a lawn and garden tool includes a shaft and a housing having a guide adapted to accept the shaft therein. One of the shaft and the guide includes an axial channel interconnected with a circumferential channel and the other one of the shaft and the guide includes a boss movably disposed within the channels and adapted to move back and forth between the axial channel and the circumferential channel. Movement of the boss within the axial channel telescopes the shaft with respect to the housing while movement of the boss within the circumferential channel rotates the shaft with respect to the housing.

According to a still further aspect of the present invention, a lawn and garden tool includes a lower housing, a shaft and an upper housing. The upper housing includes a guide, an operator actuated push-button mechanism that is biased in a first position and that is moveable to a second position, and a locking device coupled to the operator actuated push-button mechanism. The shaft is disposed within the guide and is locked at a fixed location with respect to the upper housing by the locking device when the operator actuated push-button mechanism is in the first position. The shaft can be moved axially with respect to the upper housing and can be rotated with respect to the upper housing when the operator actuated push-button mechanism is moved to the second position.

DETAILED DESCRIPTION OF THE PREFERRED EMBODIMENT

Figure 1:
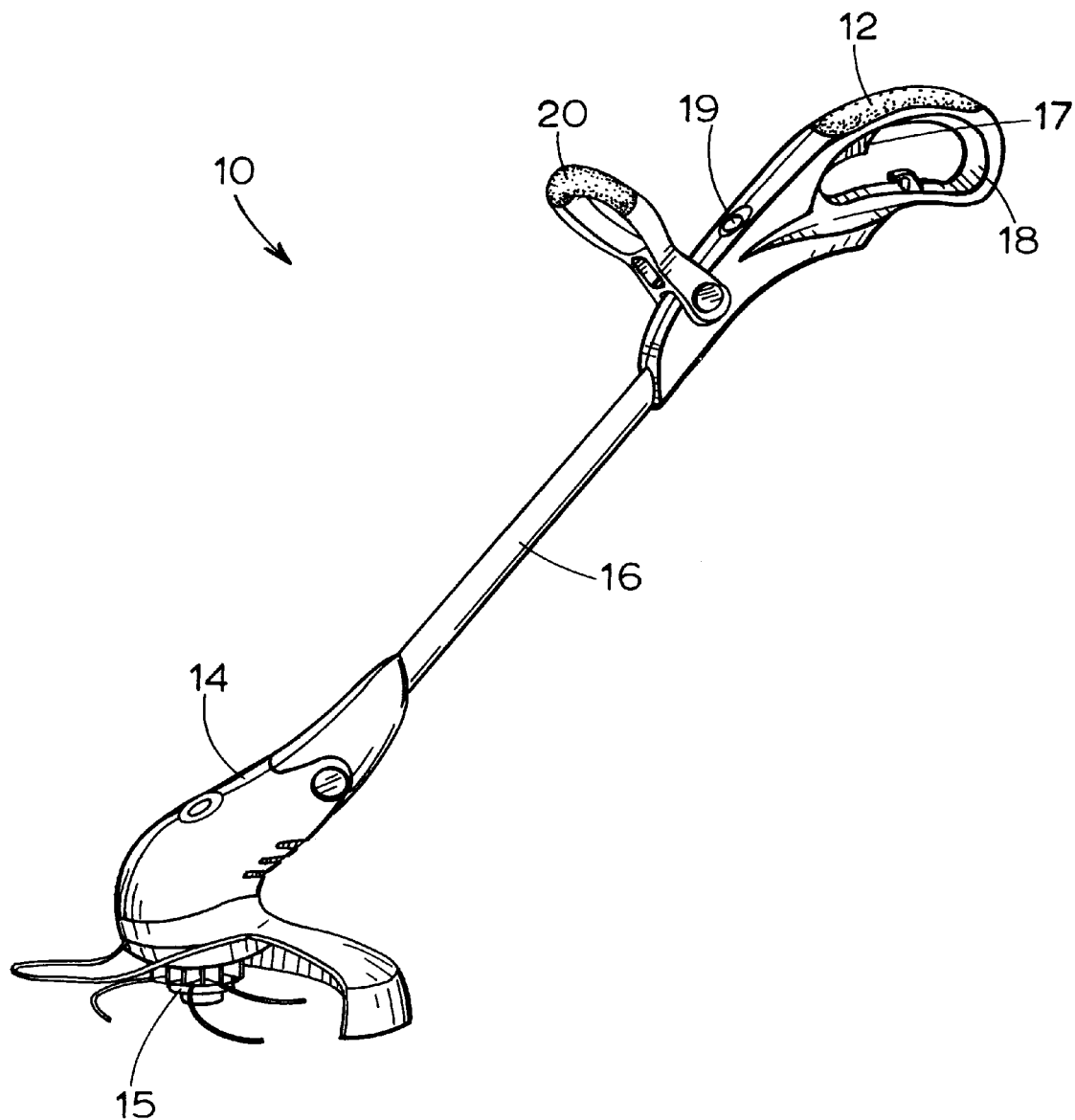
FIG. 1 is a perspective view of a string trimmer having a shaft telescoping and rotational adjustment mechanism according to the present invention.

Referring now to FIG. 1, a lawn and garden tool and, more specifically, a string trimmer 10 according to the present invention includes an upper housing 12, a lower housing 14 having a cutting mechanism 15 disposed therein and a shaft 16 that connects the upper housing 12 to the lower housing 14. The string trimmer 10 may be powered electrically, by a gas driven motor or in any other manner and may operate to rotate the cutting mechanism 15 within the lower housing 14 in any known or desired manner. As is typical, the upper housing 12 includes a trigger 17 disposed in a main handle 18. When actuated, the trigger 17 causes power to be delivered to the cutting mechanism 15 to effect rotation of the cutting mechanism.

According to the present invention, the upper housing 12 also includes a push-button mechanism 19 located in an easily accessible place on, for example, the top of the upper housing 12 between the main handle 18 and an auxiliary handle 20 to allow telescoping and/or rotation of the shaft 16 with respect to the upper housing 12. As will be understood, the push-button mechanism 19 may be actuated by an operator using a single finger (e.g., a thumb) to push the button 19 toward the lower housing 14. As a result, the push-button mechanism 19 is easy to actuate and does not require the operator to bend over and grasp the lower housing 14 of the string trimmer 10.

The push-button mechanism 19 may be moved in a simple and convenient manner between a first position (illustrated in FIG. 1) in which the shaft 16 is locked in place with respect to the handle 18 and a second position in which the shaft 16 may be elongated, shortened and/or rotated with respect to the handle 18 to thereby enable axial movement and/or rotation of the lower housing 14 with respect to the handle 18. Rotation of the lower housing 14 with respect to the handle 18 by 180 degrees converts the string trimmer 10 from a device that cuts in a horizontal plane to a device that cuts in a vertical plane, or vice-versa. Preferably the push-button mechanism 19, which comprises a locking member, is biased toward the first position so that, when the push-button mechanism 19 is released, it returns to the first position thereby locking the shaft 16 in place with respect to the handle 18.

Figure 2:
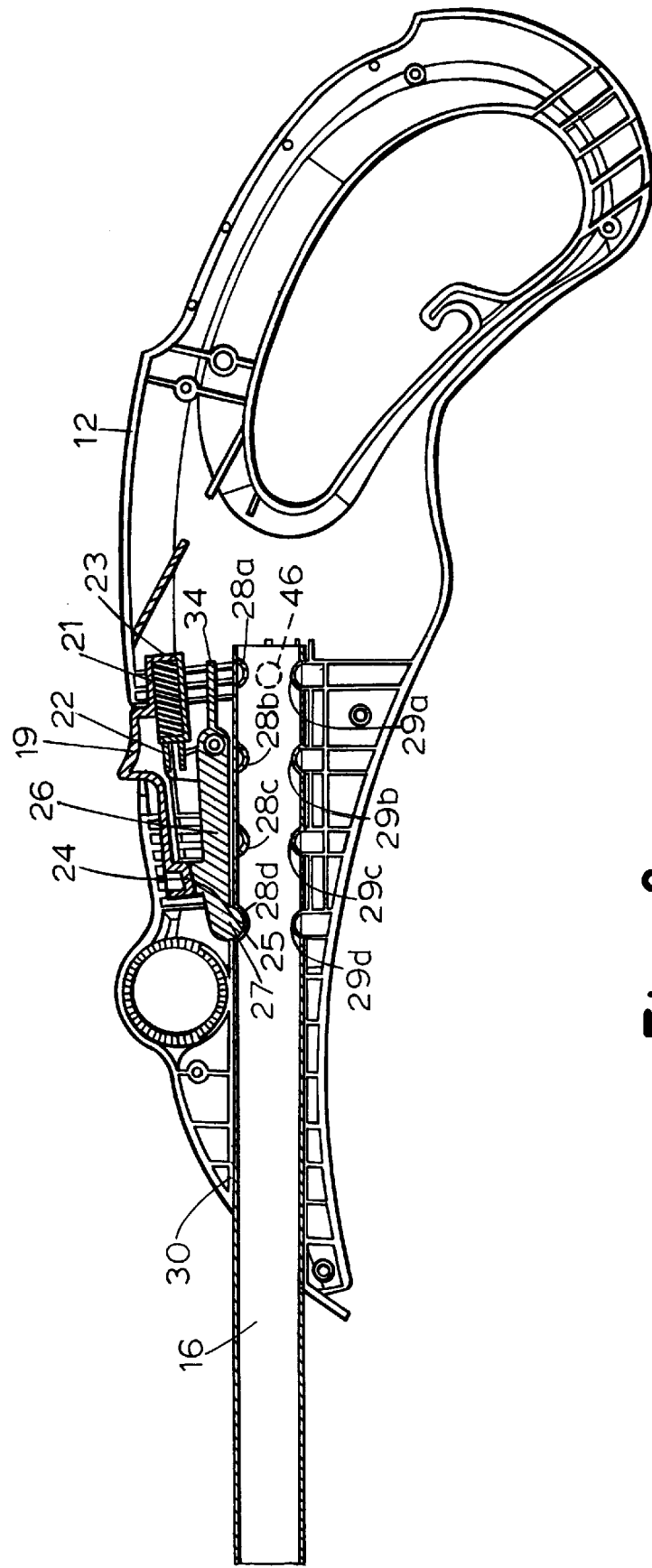
FIG. 2 is a cross-sectional side view of the upper housing of the string trimmer of FIG. 1 having a shaft inserted therein.
Figure 3:
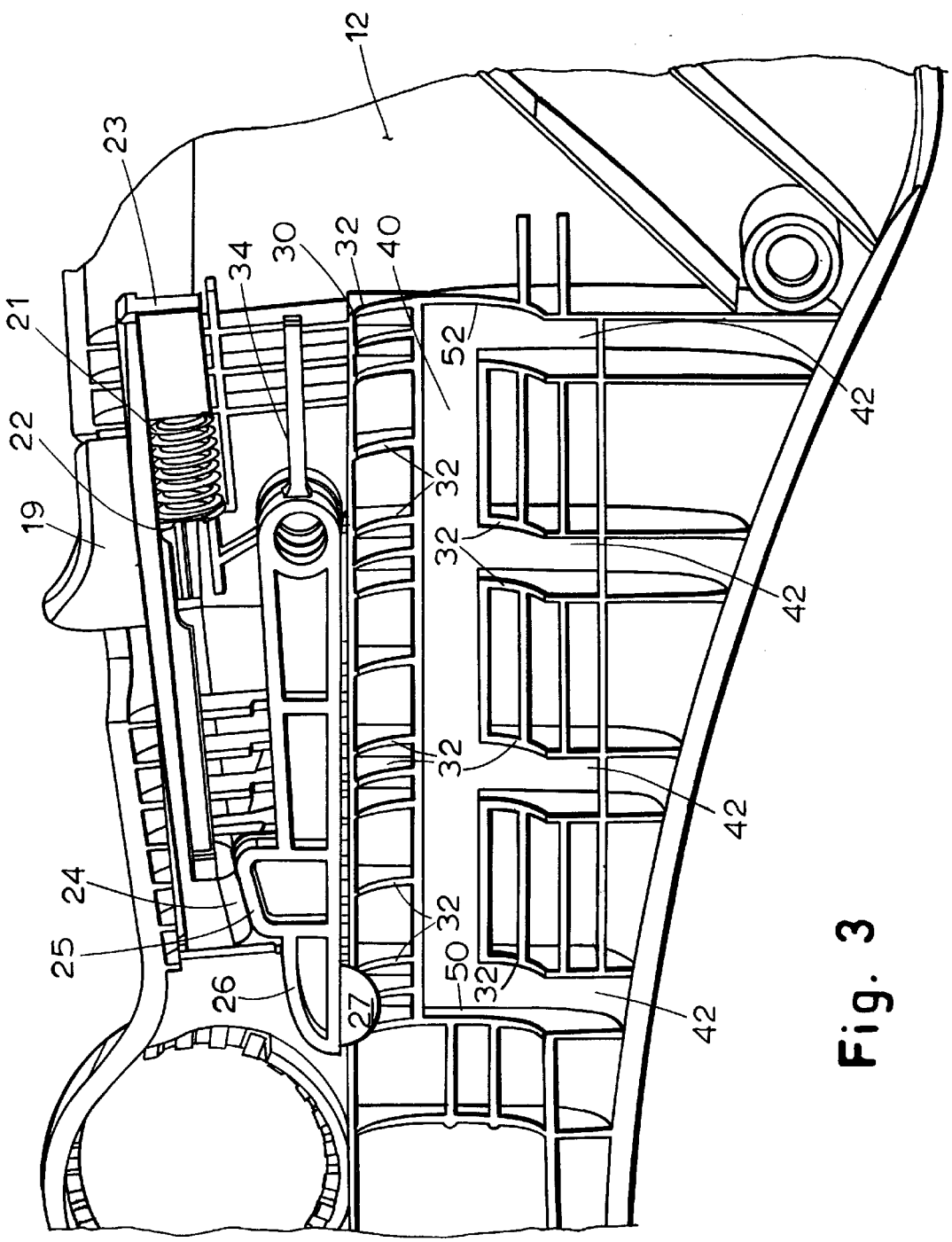
FIG. 3 is a perspective view of an interior portion of the upper housing of the string trimmer of FIG. 1 with the shaft removed.

Referring now to FIGS. 2 and 3, the interior portion of one-half of the upper housing 12 is shown in detail to illustrate the operation of one embodiment of the shaft telescoping and rotational adjustment mechanism according to the present invention. As best illustrated in FIGS. 2 and 3, the push-button mechanism 19 is biased toward a rear end of the upper housing 12 by a spring 21 disposed between a spring seat 22 mounted on an interior wall of the housing 12 and a rear wall 23 of the push-button mechanism 19. The push-button mechanism 19 includes a slanted locking surface 24 that, when in the locking position illustrated in FIGS. 2 and 3, is disposed in contact with a complementary slanting locking surface 25 of a detent locking mechanism 26 to hold the detent locking mechanism 26 in place. The detent locking mechanism 26 has a detent 27 adapted to fit within each of a plurality of axially spaced indentations 28a–28d and 29a–29d extending into the wall of the shaft 16. The indentations 28a–28d are preferably axially aligned with one another at a first circumferential location and the indentations 29a–29d are preferably aligned with one another at a second circumferential location. Also preferably, the second circumferential location is diametrically opposite the first circumferential location. Moreover, the indentations 28 and 29 are preferably shaped to conform to the detent 27 so as to produce minimal friction when the detent 27 slides into and out of the indentations 28 and 29. However, if desired, the indentations 28 and 29 could comprise holes through the wall of the shaft 16 or other types of depressions within the shaft 16. When the detent 27 is disposed within one of the indentations 28, 29, the shaft 16 is held in place when the locking surface 24 of the push-button mechanism 19 is disposed in contact with the locking surface 25 of the detent locking mechanism 26.

As best illustrated in FIG. 3, the shaft 16 rides within a guide 30 having a circular aperture formed by ribs 32 (only some of which are marked in FIG. 3) formed on interior walls of the housing 12. While only the interior of a first half of the housing 12 is illustrated in FIGS. 2 and 3, the second half of the housing 12 includes ribs formed in a pattern that is essentially a mirror image of the rib pattern illustrated in FIG. 3 so that, when the two halves of the housing 12 are connected together, the ribs 32 form the guide 30 as a circular aperture adapted to accept the shaft 16.

Referring again to FIG. 2, when the push-button mechanism 19 is pushed forward against the bias of the spring 21 to the second position, the locking surface 24 slides away from the complementary locking surface 25 of the detent locking mechanism 26 which, in turn, allows the detent 27 to move upward and out of the indentation 28 (or 29) of the shaft 16 upon axial or rotational movement of the shaft 16. Preferably, the detent locking mechanism 26 is biased toward the shaft 16 by a torsional spring 34 which provides the operator with tactile feedback indicating when the detent 27 slides into or out of one of the indentations 28 or 29 of the shaft 16 during movement of the shaft 16.

Thus, as will be understood, when the push-button mechanism 19 is pushed forward into the second position, the shaft 16 may be moved axially within the guide 30 to lengthen or shorten the distance between the upper housing 12 and the lower housing 14 and/or the shaft 16 may be rotated to change the orientation of the lower housing 14 with respect to the upper housing 12. When the shaft 16 has been moved to the desired length and/or rotation, the push-button mechanism 19 may be released, at which time the spring 21 forces the locking surface 24 back into contact with the locking surface 25 to thereby lock the detent 27 against the shaft 16 which, in turn, holds the shaft 16 in place. Preferably, the detent locking mechanism 26 may be locked only when the detent 27 is within one of the indentations 28 or 29 of the shaft 16 to assure that the shaft 16 is securely held in place. However, if desired, the detent locking mechanism 26 may be designed so that it can be locked into place when the detent 27 is located at some point between any two of the indentations 28 and/or 29.

While the shaft 16 may be elongated or rotated in any desired manner, movement of the shaft 16 is preferably limited to movement between predetermined positions associated with the indentations 28 and 29 within the shaft 16. Referring now to FIG. 3, the guide 30 includes an axial channel 40 that extends along a portion of the length of each half of the upper housing 12 and one or more circumferential channels 42 that extend 180 degrees around the circumference of the shaft 16 when the shaft 16 is inserted into the guide 30. The circumferential channels 42 are interconnected with the axial channels 40 and, preferably, are regularly spaced along the length of the axial channels 40.

Figure 4:
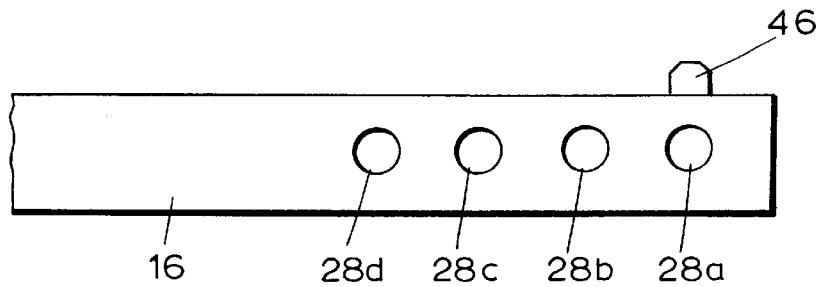
FIG. 4 is a side elevational view of FIG. 2.

As illustrated in FIG. 4, the shaft 16 includes a single boss 46 (or other pin-type element) disposed on an exterior surface of the shaft 16 at a point midway between the first series of axially spaced indentations 28 and the second series of axially spaced indentations 29. When assembled, the shaft 16 is disposed within the guide 30 so that the boss 46 resides within one of the axial channels 40 and is constrained from axial movement at either end of the axial channels 40 by end walls 50 and 52. However, because the axial channels 40 and the circumferential channels 42 are interconnected, the boss 46 may freely move between the axial channels 40 (one on each half of the upper housing 12) and any one of the circumferential channels 42 so that the shaft 16 may be moved axially when the boss 46 is within one of the axial channels 40 and may be rotated when the boss 46 is within one of the circumferential channels 42.

Figure 5:
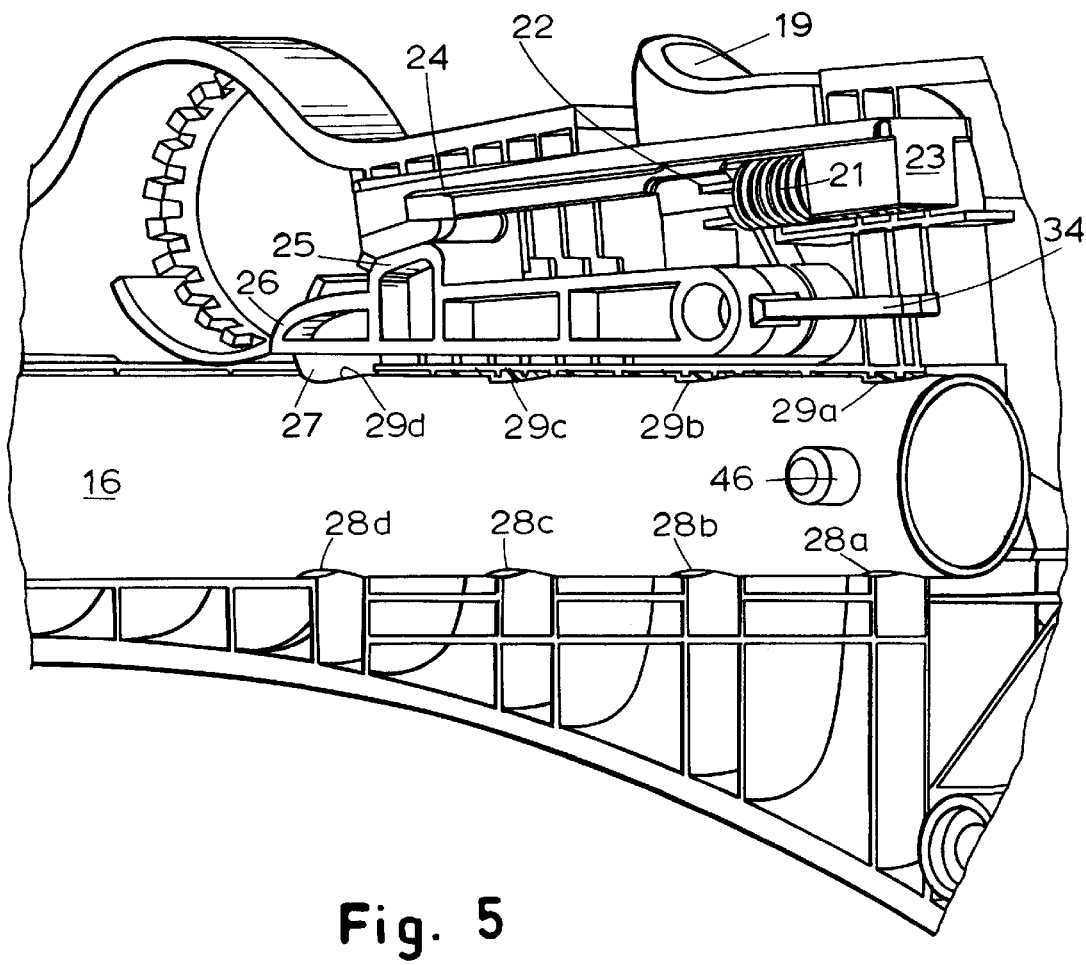
FIG. 5 is a perspective view similar to FIG. 3 illustrating the shaft inserted in the upper housing.

The indentations 28 and 29 of the shaft 16 are preferably aligned so that, when the boss 46 is disposed at an intersection of one of the circumferential channels 42 and one of the axial channels 40, as illustrated in FIGS. 2 and 5, the detent 27 of the detent locking mechanism 26 is disposed within one of the indentations 28 or 29. Thus, for example, when the boss 46 is disposed within the axial channel 40 illustrated in FIG. 3 and resides against the end wall 52, the detent 27 resides in the indentation 28d farthest away from the boss 46. When the shaft 16 is in this position, the string trimmer 10 may be configured for normal trimming operation. Moving the shaft 16 axially toward the front of the housing 12 (when the push-button mechanism 19 is in the second and unlocked position) causes the boss 46 to ride in the axial channel 40 illustrated in FIG. 3 while the detent 27 slides into and out of the second, third and fourth indentations 28 on the shaft 16, thereby elongating the shaft 16. Alternatively, rotating the shaft 16 from the position indicated in FIG. 2 causes the boss 46 to ride in the rear-most circumferential channel 42 while the detent 27 slides out of the indentation 28d and into the indentation 29d, angularly separated from the indentation 28d by 180 degrees. When the detent 27 slides into the indentation 29d, the handle/shaft configuration is as illustrated in FIG. 5, wherein the boss 46 resides in the axial channel 40 on the opposite half of the upper housing 12 (i.e., the portion not shown in FIG. 5). In this position, the string trimmer 10 may be configured for edging operation. Of course, the shaft 16 may be extended from the position illustrated in FIG. 5 by moving the boss 46 of the shaft 16 toward the front of the upper housing 12 causing the detent 27 to slide into and out of consecutive ones of the indentations 29. The shaft 16 may also be rotated so that the boss 46 rides in any of the other circumferential channels 42.

Thus, as will be understood, whenever the push-button mechanism 19 is moved forward to release the detent locking mechanism 26, the shaft 16 may be moved axially and may be rotated with respect to the upper housing 12 in any manner defined by movement of the boss 46 within the interconnected channels 40 and 42. During this time, the predetermined axial and rotational positions at which the shaft 16 can be locked into place are indicated by the tactile feedback provided by the spring-biased detent locking mechanism 26 riding against the shaft 16. As will also be understood, the shaft 16 may be locked into place at any of the positions where one of the indentations 28 or 29 on the shaft 16 is contacted by the detent 27.

While the string trimmer 10 has been described herein as including four circumferential channels 42 and four axially spaced indentations on two opposing circumferential locations of the shaft 16, the string trimmer 10 could include any other number of circumferential channels and/or any other number of axially spaced indentations at one or more (e.g., two, three, four, etc.) circumferential locations of the shaft 16, to thereby allow movement and rotation of the shaft 16 to other predetermined axial or rotational positions. Furthermore, if desired, the shaft 16 can be locked into place at positions other than those at which indentations 28 and 29 are provided and, thus, the shaft 16 may be elongated or shortened to lengths other than those associated with the indentations 28 and 29. Still further, while the present invention has been described herein as including a boss 46 on the shaft 16 and channels 40 and 42 formed within the upper housing 12, the boss 46 could alternatively be located on the upper housing 12 and positioned so that it rides in circumferential and axial channels formed in the shaft 16. Moreover, while the shaft telescoping and rotational adjustment mechanism of the present invention has been described herein for use on a string trimmer, this mechanism can also be used on other lawn and garden tools, such as blowers, brush cutters, etc.

Thus, while the present invention has been described herein with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

It is claimed:

1. A lawn and garden tool comprising:
   a shaft; and
   a housing having a guide adapted to accept the shaft therein;
   wherein one of the shaft and the guide includes a plurality of axial channels interconnected with a plurality of circumferential channels and wherein the other one of the shaft and the guide includes a boss movably disposed within the channels to move between the axial channels and the circumferential channels and wherein movement of the boss within the axial channels telescopes the shaft with respect to the housing and movement of the boss within the circumferential channels rotates the shaft with respect to the housing; and
   wherein the housing further includes a locking mechanism having an operator actuated locking member moveable between first and second positions and a locking device coupled to the locking member and disposed adjacent the shaft, wherein movement of the operator actuated locking member into the first position forces the locking device to hold the shaft at a stable position with respect to the housing and wherein movement of the operator actuated locking member into the second position allows axial and rotational movement of the locking device with respect to the shaft.

2. The tool of claim 1, wherein the shaft includes a plurality of indentations and wherein the locking device includes a detent mechanism having a detent that comes into contact with the shaft and is adapted to fit within the indentations.

3. The tool of claim 2, wherein a first one of the plurality of indentations is angularly offset from a second one of the plurality indentations by approximately 180 degrees.

4. The tool of claim 2, wherein the indentations are spaced so that the detent resides within one of the indentations when the boss is located at an intersection of one of the axial channels and one of the circumferential channels.

5. A lawn and garden tool comprising:
   a lower housing;
   an upper housing having a handle, a trigger and an axial channel interconnected with a circumferential channel;
   a shaft connected between the upper housing and the lower housing having a boss adapted to travel in the interconnected axial channel and circumferential channel, wherein movement of the boss within the axial channel telescopes the shaft and movement of the boss within the circumferential channel rotates the lower housing with respect to the upper housing; and
   a locking mechanism disposed on the upper housing to lock the shaft at a particular position;
   wherein the locking mechanism includes a detent mechanism adjacent a locking member that is moveable between first and second positions, wherein the locking member comes into contact with and prevents movement of the detent mechanism when the locking member is in the first position and wherein the locking member allows movement of the detent mechanism when the locking member is in the second position.

6. The tool of claim 5, wherein the locking member includes a spring that biases the locking member toward the first position.

7. The tool of claim 5, wherein the locking member includes an operator actuated member that causes movement of the locking member between the first and second positions when actuated by an operator.

8. The tool of claim 5, wherein the handle comprises a main handle and further including an auxiliary handle, wherein the locking mechanism is disposed on the upper housing between the main handle and the auxiliary handle.

9. A lawn and garden tool comprising:
   a lower housing;
   an upper housing having a handle, a trigger and an axial channel interconnected with a circumferential channel; and
   a shaft connected between the upper housing and the lower housing having a boss adapted to travel in the interconnected axial channel and circumferential channel, wherein movement of the boss within the axial channel telescopes the shaft and movement of the boss within the circumferential channel rotates the lower housing with respect to the upper housing;
   wherein the circumferential channel comprises a first circumferential channel interconnected with the axial channel at a first axial position and further including additional circumferential channels interconnected with the axial channel at additional axial positions.

10. The tool of claim 9, further including an additional axial channel interconnected with the first circumferential channel and the additional circumferential channels.

11. A lawn and garden tool comprising:
    a lower housing;
    an upper housing having a handle, a trigger and an axial channel interconnected with a circumferential channel;
    a shaft connected between the upper housing and the lower housing having a boss adapted to travel in the interconnected axial channel and circumferential channel, wherein movement of the boss within the axial channel telescopes the shaft and movement of the boss within the circumferential channel rotates the lower housing with respect to the upper housing; and
    a detent mechanism having a detent that locks the shaft in place and wherein the shaft includes indentations therein capable of accepting the detent.

12. The tool of claim 11, wherein the indentations are spaced so that the detent resides within one of the indentations when the boss is located at an intersection of the axial channel and the circumferential channel.

13. A lawn and garden tool comprising:
    a lower housing;
    an upper housing including a guide, an operator actuated push-button mechanism including a first slanting surface that is biased in a first position and that is moveable to a second position, and a locking device having a cooperating slanting surface disposed adjacent the first slanting surface when the operator actuated push-button mechanism is in the first position; and
    a shaft disposed within the guide and extending from the upper housing to the lower housing;

wherein the shaft is locked at a fixed location with respect to the upper housing by the locking device when the operator actuated push-button mechanism is in the first position and wherein the shaft is adapted to move axially with respect to the upper housing and to rotate with respect to the upper housing when the operator actuated push-button mechanism is in the second position.

14. The tool of claim 13, wherein one of the shaft and the guide includes an axial channel interconnected with a circumferential channel and wherein the other one of the shaft and the guide includes a boss movably disposed within the channels to move back and forth between the axial channel and the circumferential channel such that movement of the boss within the axial channel telescopes the shaft with respect to the upper housing and movement of the boss within the circumferential channel rotates the shaft with respect to the upper housing.

15. The tool of claim 14, wherein the one of the shaft and the guide includes a plurality of circumferential channels interconnected with a plurality of axial channels.

16. The tool of claim 15, wherein the locking device includes a detent and the shaft includes a multiplicity of indentations that are adapted to accept the detent and that are spaced so that the detent resides within one of the indentations when the boss is located at an intersection of one of the axial channels and one of the circumferential channels.

17. The tool of claim 13, wherein the operator actuated push-button mechanism includes a first spring that biases the operator actuated push-button mechanism in the first position and wherein the locking device includes a second spring that biases the locking device toward the shaft.

* * * * *